(12) United States Patent
Folkvang (10) Patent No.: US 9,938,164 B2
(45) Date of Patent: Apr. 10, 2018

(54) HYDROCARBON-WATER SEPARATOR

(71) Applicant: Stauper Offshore AS, Sandefjord (NO)

(72) Inventor: Jørn Folkvang, Stathelle (NO)

(73) Assignee: Stauper Offshore AS, Sandefjord (NO)

( * ) Notice: Subject to any disclaimer, the term of this patent is extended or adjusted under 35 U.S.C. 154(b) by 120 days.

(21) Appl. No.: 15/152,930

(22) Filed: May 12, 2016

(65) Prior Publication Data
US 2017/0275185 A1 Sep. 28, 2017

(30) Foreign Application Priority Data
Mar. 23, 2016 (NO) .................................. 20160495

(51) Int. Cl.
| | | |
|---|---|---|
| *C02F 1/24* | (2006.01) | |
| *B01D 17/02* | (2006.01) | |
| *C02F 1/40* | (2006.01) | |
| *C02F 1/20* | (2006.01) | |
| *B01D 19/00* | (2006.01) | |

(Continued)

(52) U.S. Cl.
CPC ............ *C02F 1/24* (2013.01); *B01D 17/0205* (2013.01); *B01D 17/0217* (2013.01); *B01D 19/00* (2013.01); *B01D 19/0005* (2013.01); *B01D 19/0057* (2013.01); *C02F 1/20* (2013.01); *C02F 1/40* (2013.01); *B03D 1/1418* (2013.01);
(Continued)

(58) Field of Classification Search
CPC ............ B01D 17/0205; B01D 17/0217; B01D 19/0005; B01D 19/0057; B03D 1/1418; C02F 1/24; C02F 1/40; C02F 1/20; C02F 2101/32; C02F 2103/10; C02F 2103/008
See application file for complete search history.

(56) References Cited

U.S. PATENT DOCUMENTS

| | | | |
|---|---|---|---|
| 2,037,426 A | | 4/1936 | McKeever |
| 3,905,890 A | * | 9/1975 | Minegishi ............... C02F 1/463 204/273 |

(Continued)

FOREIGN PATENT DOCUMENTS

| | | |
|---|---|---|
| EP | 1 779 911 A1 | 5/2007 |
| EP | 2 263 768 A1 | 12/2010 |

(Continued)

OTHER PUBLICATIONS

International Bureau, International Search Report in International Application No. PCT/NO2017/000005, dated Jun. 2, 2017.

(Continued)

*Primary Examiner* — Thomas M Lithgow
(74) *Attorney, Agent, or Firm* — Leydig Voit & Mayer (57) ABSTRACT

An apparatus for separating hydrocarbons from water, comprising a tank segment with a fluid inlet subsequent a housing with a liquid-gas mixer. The fluid inlet through a cylindrical tank wall, and further through the wall of a conical wall segment, a pipe spread, combining radial and axial flow over ring mounted guide vanes at the upper part of the conical wall segment. A hydro carbon outlet is located at a top end and a water outlet at a bottom end of tank-segment. A pipe for scale and debris removal is connected to the lower part of the bowl. The inner conical wall segment extends to the top end of the tank segment and at this location comprises a ring of vertically mounted guide vanes.

15 Claims, 7 Drawing Sheets

(51) Int. Cl.
  *C02F 101/32* (2006.01)
  *C02F 103/10* (2006.01)
  *C02F 103/00* (2006.01)
  *B03D 1/14* (2006.01)

(52) U.S. Cl.
  CPC .... *C02F 2101/32* (2013.01); *C02F 2103/008* (2013.01); *C02F 2103/10* (2013.01)

(56) References Cited

U.S. PATENT DOCUMENTS

| | | |
|---|---|---|
| 4,369,047 A | 1/1983 | Arscott et al. |
| 4,371,382 A | 2/1983 | Ross |
| 5,262,046 A | 11/1993 | Forgac et al. |
| 2010/0187186 A1* | 7/2010 | Howdeshell ....... B01D 17/0205 210/744 |

FOREIGN PATENT DOCUMENTS

| | | |
|---|---|---|
| EP | 2 442 881 B1 | 1/2014 |
| WO | WO 99/65588 A1 | 12/1999 |
| WO | WO 02/41965 A2 | 5/2002 |
| WO | WO 2010/080035 A1 | 7/2010 |
| WO | WO 2013/109345 A1 | 7/2013 |

OTHER PUBLICATIONS

Norwegian Patent Office, Search Report in corresponding Norwegian Application No. 20160769, dated Oct. 7, 2016.

\* cited by examiner

Fig. 1

Section A-A

Fig. 2

Section B-B

HYDROCARBON-WATER SEPARATOR

CROSS-REFERENCE TO RELATED APPLICATIONS

This patent application claims the benefit of Norwegian Patent Application No. 20160495, filed Mar. 23, 2016, which is incorporated by reference.

FIELD OF THE INVENTION

The present invention concerns an apparatus for separating hydrocarbons and water, in particular of the kind using a process gas for lifting oil.

BACKGROUND OF THE INVENTION

Prior and Related Art

Separating hydrocarbons, i.e. oil and/or gas, and water is required in several applications. One typical example is separating oil from bilge water aboard a ship. Another example is separating oil and/or natural gas from a well fluid produced at an offshore oil or gas field. In both examples, the input fluid typically has a high content of water. Further, the rate of input fluid may be large, and the space available for a separator tank aboard a ship or in an offshore platform may be limited or costly.

Hydro-cyclones and other fast liquid-liquid separators are known in the art, and are not further discussed herein. The invention concerns a separator for an input fluid containing mainly water, e.g. the water output from a hydro-cyclone.

Separators of the kind described herein use a process gas, e.g. $N_2$ or $CO_2$, to form bubbles. Oil in the input fluid attaches to the bubbles, and rises to the surface, whereas the water sinks. Gaseous hydrocarbons also form bubbles and are removed from the top of the separator tank together with process gas and oil. As the amount of dissolved gas in a liquid is proportional to the pressure above the liquid, the pressure in the output liquid is typically equal to ambient pressure to ensure that the gas is released within the separator tank. The pressure at the inlet may be reduced in one or more stages, and may involve pressures below atmospheric pressure to enhance bubble formation and degassing.

WO 02/41965 discloses a separator tank wherein a vortex is set up within a vertical, cylindrical tank to enhance separation. More particularly, tank has a helical guide on its inner surface to create a rotational flow. The rotational flow forces the lighter component, such as oil and gas droplets, towards an inner concentric cylindrical wall where they coalesce and rise to the surface of the liquid, whereas the heavier components move radially outward and downward. Water is discharged through a water outlet in the lower part of the tank.

EP 1 779 911 A1, EP 2 263 768 A1 and EP 2 442 881 B1 describe different varieties of a vertical cylindrical tank in which separation is enhanced by setting up at least one vortex. These varieties have a vortex breaker in the form of a disc near the water outlet in the lower part of the tank.

WO9965588 describes a separator tank for removing water from oil, in which process gas is added to the oil before the mixture is introduced at the bottom of a first section. Pressures are adjusted such that the gas forms bubbles rising through the fluid. The gas in the bubbles is rapidly heated by the ambient oil, so that its relative humidity decreases and water vapour is pulled from the oil. The gas and water vapour is withdrawn from the top of the container, while the oil is removed from the bottom of a second section. The first and second sections of the container are separated by a partition wall, preferably in the form of a tube.

WO210080035 and WO213109345A1 provide examples of a vertical, cylindrical separator tank in which a gas, e.g. $N_2$, is added to the input fluid, and the mixture is entered into the tank through a central pipe within the tank. The central pipe comprises branches and tangentially oriented nozzles to set up a vortex. An outlet for hydrocarbons at the top, a helical guide on its inner surface, a vortex breaker and an outlet for clean water at the bottom are also provided.

The separators above may comprise several tank segments or stages, such that the water output from one stage is the fluid input to the next stage below. Two to four stages are common, and each stage typically requires process gas. The pressure may be equal in all stages. However, it may be desirable to limit the pressure drop in each stage or tank segment to achieve a relatively slow flow within the segment, thereby increasing the amount of oil adhering to the bubbles within the segment, and hence the efficiency of the segment. A limited pressure drop at each stage may require additional stages to arrive at the desired output pressure.

A general objective of the present invention is to solve at least one of the problems above while retaining the benefits of prior art. More particularly, objectives of the present invention include improving the efficacy and separation rate in a prior art separator, reduce the amount of process gas required and/or reduce the cost of operation.

BRIEF SUMMARY OF THE INVENTION

This is achieved by an apparatus for separating hydrocarbons from water according to claim 1.

More particularly, the invention concerns an apparatus for separating hydrocarbons from water, comprising a tank segment with a fluid inlet through a cylindrical tank wall and further through the wall of an inner conical shaped tank or bowl, with a hydrocarbon outlet at a top end and a water outlet from the outer tank at a bottom end. The inlet pipe protruding into two or more pipes, i.e. pipe spread, with open ends mounted tangentially and close to the inner wall of the conical segment thereby forcing the inlet flow into a rotating upward motion along the conical wall towards vertically and circularly mounted guide vanes at the upper end of the bowl.

In operation, an initial fluid contains dissolved gas, including process gas supplied upstream from the inlet. The tangentially mounted pipe assembly inside the conical shaped tank causes the fluid to rotate and rise within the annular space formed by the conical wall in a conventional manner. The conical bowl configuration (inlet chamber) with baffle plates at the upper part of the cone and the top mounted guide vanes convert the helical liquid flow from the lower part of the conical bowl into laminar and axial flow over the guide vanes. There will be no pulsation or oscillation of the liquid layers in the area between the position of the guide vanes and the outer tank wall. This greatly enhances the overall efficiency of the process. Water relieved from gas and oil at the upper end of the conical tank flows into the space between outer tank and the inner conical bowl and sinks towards the water outlet port at the bottom of the tank. Any debris, scale and small particles may be drained off through a separate pipe-connection attached to the bottom of the conical tank. The conical shaped area of the inner tank will provide an additional pressure drop thereby increasing the release of gas without affecting the upward rotating flow adversely.

In some embodiments, the apparatus further comprises a subsequent conical bowl wherein the fluid of the second conical bowl segment is connected to the water reservoir outlet between the outer tank and the inner conical bowl through one or more pipes. The subsequent bowl segment is preferably similar to the bowl segment discussed previously, but may, at least in principle, have a different design.

The internal pressure in each conical bowl segment may be less than the pressure in any previous conical bowl segment. This allows for a gradual reduction of pressure, for example to or below atmospheric pressure, and may be useful to ensure efficient flow within each bowl segment over a large pressure differential from the first inlet to the last outlet. Additional supplies of process gas at each segment may not be required, as more gas is released from the fluid during each pressure drop.

In some embodiments, however, the pipe has a subsequent gas inlet for process gas. Additional process gas may be particularly desirable in applications where the pressure difference between the first inlet and the last water outlet is relatively small, i.e. where a large fraction of gas is released in the first tank segment. However, additional process gas may also be supplied to subsequent tank segments for different reasons.

In a preferred embodiment, the channels or pipes are mounted inside the conical wall segment and between the conical wall segment and the outer tank segment. This greatly improves the laminar flow control, the capacity per unit volume and, most significantly, the overall efficiency. There are no internal couplings, bolts and nuts an unwanted scales are removed by recognised chemicals. Adequate internal inspection is achieved via manholes. Gas supply, sensors, operating valves etc. are mounted at the inlet and outlet piping from the outer tank segment.

In a preferred embodiment a one stage unit with one conical wall segment or inlet chamber has double inlet ports for produced water and gas supplies at the bottom of the tank 160. By closing and opening of the accesses to the internal conical wall segment—mounted distribution pipes the following range of capacities are obtained as a minimum:
a) 15 m3/hr to 150 m3/hr
b) 30 m3/hr to 300 m3/hr
i.e. Turn down: 10% of capacity Preferably, a mixer for mixing the process gas into the fluid is provided upstream from the inlet and preferably a mixer as shown on FIG. 4 Section C-C, 170 arrow E. The mixer can be of any kind known in the art, and ensures that the process gas is evenly distributed in the fluid entering through the inlets.

In a preferred embodiment, the fluid inlet comprises a flow regulator. The flow regulator can be of any conventional design, i.e. a rotatable throttle body as in a butterfly valve or a sliding plate for covering or uncovering a slit in the tank wall. The flow regulator adjusts the fluid flow into the apparatus, i.e. by fully closing a fraction of the inlets or by reducing or increasing the aperture through every inlet. In this manner, the apparatus can be adapted to a range of input volume rates, and of course also to varying volume rates. Sensors, controllers, actuators and control algorithms, e.g. feedback to adapt the inlets to a measured flow or feed forward to adapt the inlets in advance to receive a known change, are generally known, and may be adapted to the apparatus of the invention in a conventional manner.

In embodiments with two or more conical wall segments, the hydrocarbon outlets from the different bowl segments may lead into a separate outlet pipes prior to entering a common manifold collecting the pipes with the separate oil flows. In this case, reduction valves from each conical wall segment to a common outlet manifold are required. The alternative, each outlet pipe from each conical wall segment, may be preferable in embodiments with a other tank segments.

Figure 1:
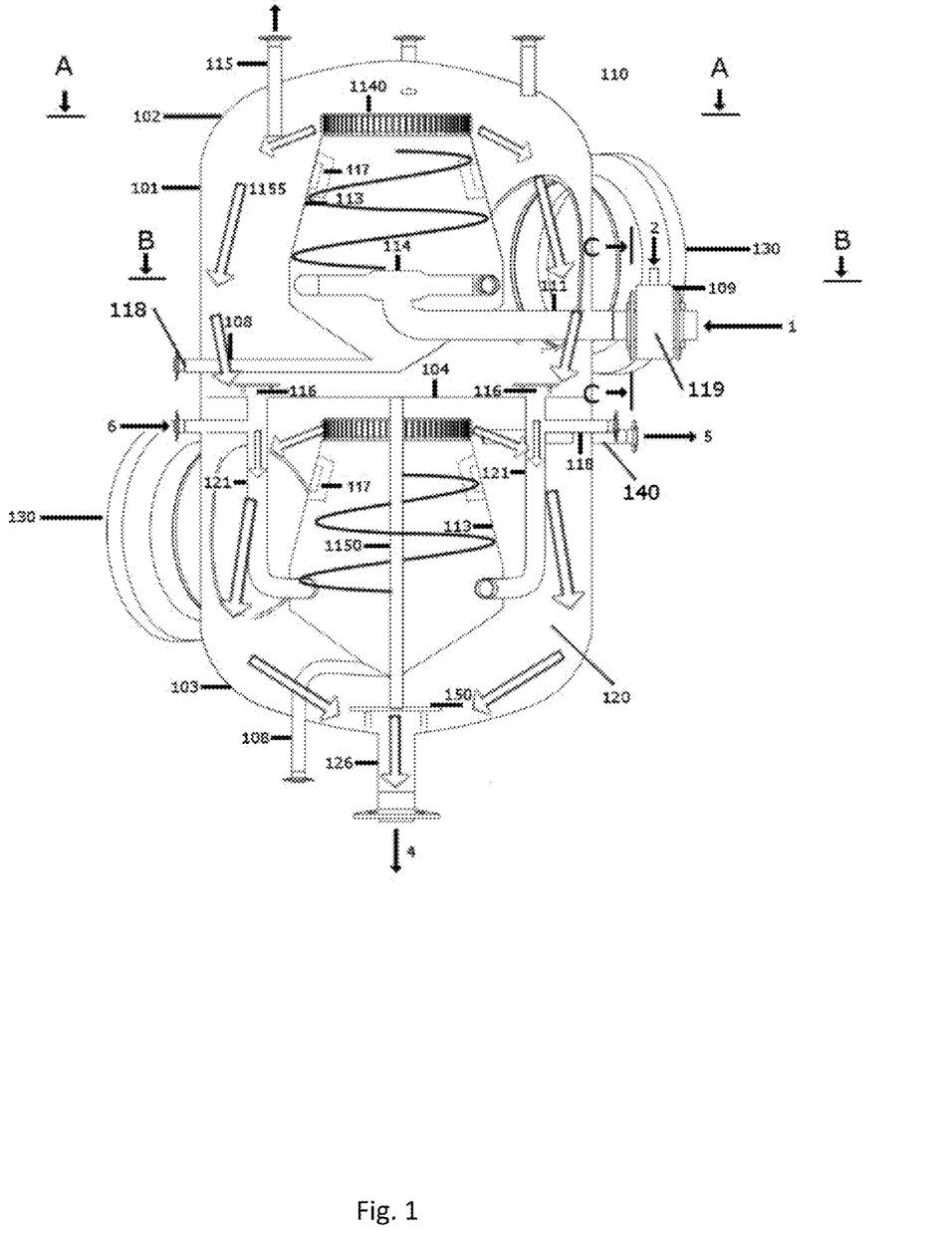
FIG. 1 illustrates a preferred embodiment of the invention with two conical bowl segments.
Figure 7:
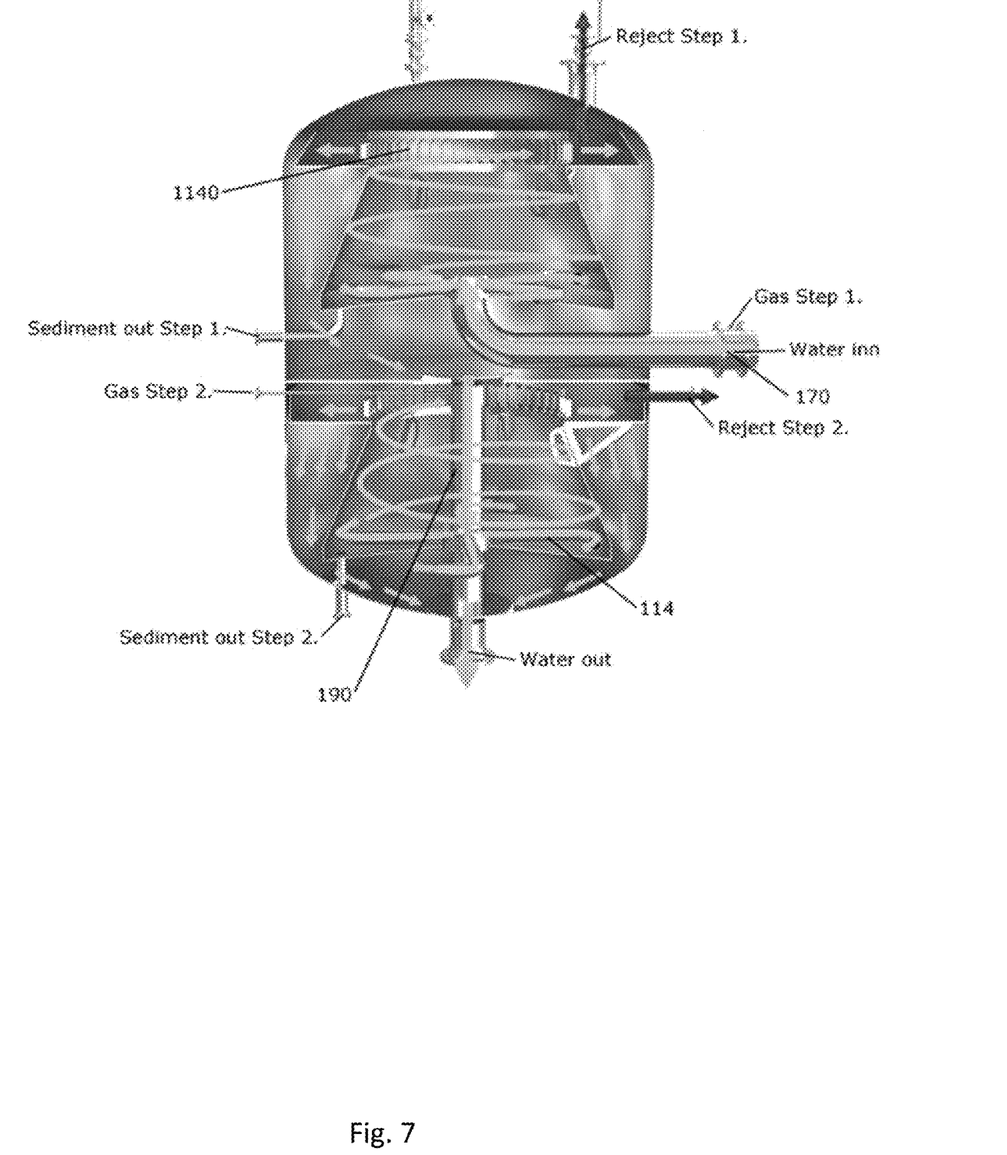
FIG. 7 illustrates a preferred embodiment of the invention with two or more conical shaped segments with inclined plated bottoms protruding radially downwards.

In a preferred embodiment with two or more conical wall segments the downward flowing marginally contaminated water may enter the following conical wall segment through a centre mounted vertical pipe, FIG. 7, thereby avoiding separate piping arrangements, (116) FIG. 1 and reducing manufacturing costs and improving flow conditions.

BRIEF DESCRIPTION OF THE SEVERAL VIEWS OF THE DRAWINGS

The invention will be described in greater detail below be means of an exemplary embodiment with reference to the accompanying drawings, in which.

DETAILED DESCRIPTION OF THE INVENTION

FIG. 1 illustrates an apparatus 100 according to the invention. The apparatus 100 comprises a cylindrical tank wall 101 closed by a top cap 102 and a bottom cap 103. An input flow of initial fluid 1 contains a mixture of water, hydrocarbons and a process gas 2, i.e. $N_2$ or $CO_2$. The process gas is thoroughly mixed with hydrocarbons and water in a mixer 109, and fed into a cone shaped bowl through a pipe which is split into two or more pipes, i.e. pipe spread, with pipe ends protruding tangentially to the inner conical wall forcing the fluid into an upward rotating laminar flow in a clockwise direction when viewed from above. This is advantageous on the northern hemisphere due to the Coriolis force and hence the natural direction of a vortex north of equator. Accordingly the pipe assembly designed for the southern hemisphere would preferably guide the input fluid in the opposite direction, i.e. counter-clockwise when viewed from above.

The upper part of the bowl comprises a ring of vertically mounted guide vanes 1140, and baffle plates 117 preferably opposing the rotating direction of flow thereby converting the rotating motion of the fluid into a combined radial and axial laminar upward motion into the annular space between the conical wall segment 113 and the tank wall 101.

Figure 2:
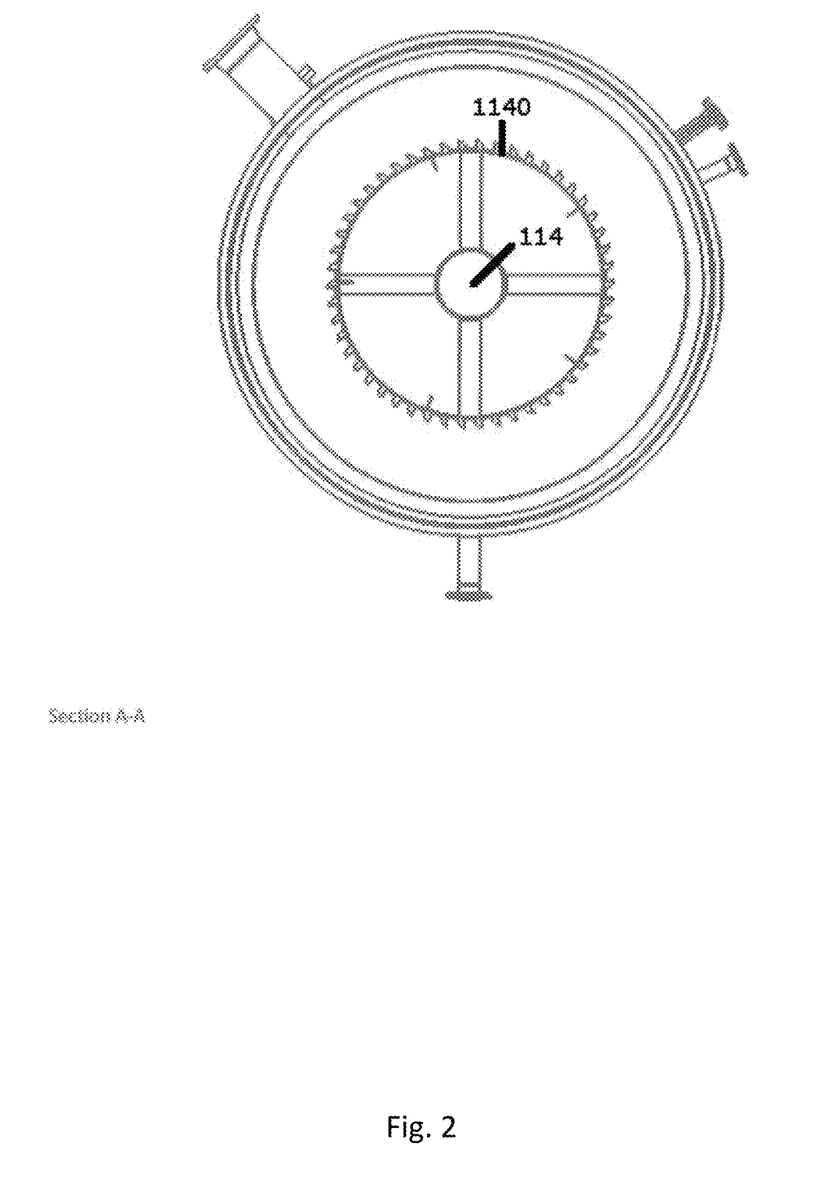
FIG. 2 is a cross section along plane A-A in FIG. 1.

FIG. 2 is a cross section along the plane A-A in FIG. 1, and illustrates the position of the guide vanes on top of the cone.

Figure 3:
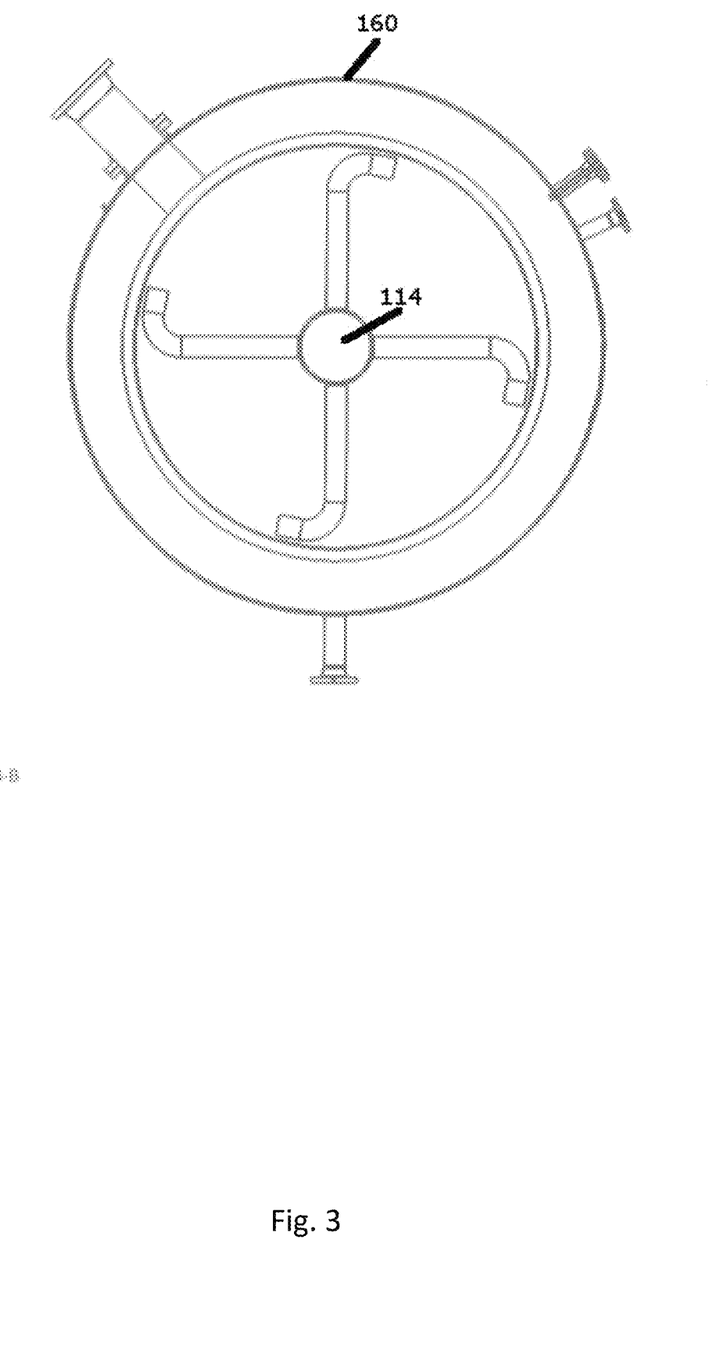
FIG. 3 is a cross section along plane B-B in FIG. 1

FIG. 3 is a cross section along the plane B-B in FIG. 1 and illustrates the initial fluid flow from mixer 109 into the tangentially directions of the pipe outlets and along the conical wall segment towards the upper ring mounted guide vanes maintaining an adequate pressure differential of, say, 0.3 bar.

As shown by arrows in FIG. 1, during operation the input fluid rises along the inner conical wall 113 toward guide vanes 1140, which extends axially towards the top cap 102, in general above the top of the tank segment. Due to the pressure drop over the inlets 111 and upwards along the conical wall segment 113 and over the vertical mounted guide vanes 1140, process gas and gaseous hydrocarbons form bubbles as the fluid rises into the space between the upper part of the conical wall segment 1140 and the tank cap 102. Baffle plates 117 are placed at the upper part of the conical wall segment 113 and close to the guide vanes in order to arrest the swirling motion of the fluid.

The main release of gas bubbles occurs in the vortex formed in the conical wall segment space framed by the wall 113.

Oil droplets attach to the bubbles formed in the annular space of the conical wall segment of the first stage 110, and leave the first stage through a first hydrocarbon outlet 115 at the top cap 102. Arrow 2 indicates a flow of hydrocarbons and process gas from the first stage of tank segment 110.

The vortex set up in the space formed by the inner conical wall 113 aids separation. In particular, the density of the fluid within the inner conical wall segment 113 increases as process gas and hydrocarbons are removed. The denser fluid, relieved from gas and hydrocarbons move radially outwards from the guide vanes 1140 as it descends. The wide area between the flow outlets from the guide vanes 1140 and the tank wall results in negligible fluid disturbance and thereby enhances further separation of gas and oil droplets. At equilibrium, the densest fluid, i.e. the cleanest water, collects at the bottom of the tank segment 110. Hence, a water outlet 116 pipe is provided through a disc separating the following stage 120 from the previous stage 110

No deflectors are required in the area between the outside of the conical wall segment and the tank wall 101.

A pipe 121 connects the water outlet 116 from the first tank segment 110 to the fluid inlet 121 to the conical wall configuration of the subsequent tank segment 120. The inlet 121 is similar to the inlet 111, with the pipe spread inside the conical wall segment identical to the previous description.

In particular, the second tank segment 120, and in general any subsequent tank segment are preferably designed in a similar manner. Thus, any subsequent segment 120 can be connected in series to a previous tank segment 110, 120 by outlets 116 and piping arrangement 121.

The manholes 130 facilitates maintenance and inspection. Further, mounting and/or connecting a gas inlet 118 for an additional supply of process gas 6, valves and other equipment (not shown) is readily performed on external piping from tank-segments 101 and tank caps 102 and 103.

Each tank segment 110, 120 etc. has a separate hydrocarbon outlets i.e. 115, 140 etc. This can be a separate pipe from each stage. The outlet from pipe 140 illustrated by arrow 5 is a flow of process gas and hydrocarbons similar to the flow from outlet 115 shown by arrow 3. If desired, the outlet 115 from the first tank segment 110 can also be an inlet to pipe 140.

The water outlet 126 from the last tank segment is shown at the bottom of stage 120, and the last tank segment 120 is provided with a conventional vortex breaker in the form of a horizontal disc 150. The water outlet 126 might alternatively be openings through the outer wall 101 as the water outlet 116 from tank segment 110.

Tests have shown that the efficacy is greatly improved by limiting the radial flow as described above. As a result, typically more than 90% the hydrocarbon contained in the initial fluid leave the separator through the first hydrocarbon outlet 115 together with process gas. In turn, this reduces the need for subsequent segments, e.g. to one subsequent tank segment 120 as shown in FIG. 1, whereas a typical prior art separator tank would require three or four tank segments to achieve a low content of hydrocarbons in the final water flow 4.

FIG. 2 is a horizontal cross section through the separator 100 along plane A-A in FIG. 1 and illustrates the position of the guide vanes 1140 on top of the conical wall segment and a section of the inlet pipe spread 114.

FIG. 3 is a horizontal cross section along plane B-B where one pipe inlet spreads into two, four or more end-open tangentially mounted pipes 114 along the inner conical wall segment 113.

In accordance with common practice, the articles 'a', 'an' and 'the' when used in the claims mean 'at least one', whereas 'one' means exactly one. Thus, 'an inlet' stated in the claims should be construed as 'at least one inlet'. Similarly, the claims imply at least one input flow 1, at least one mixer 109 etc.

Figure 4:
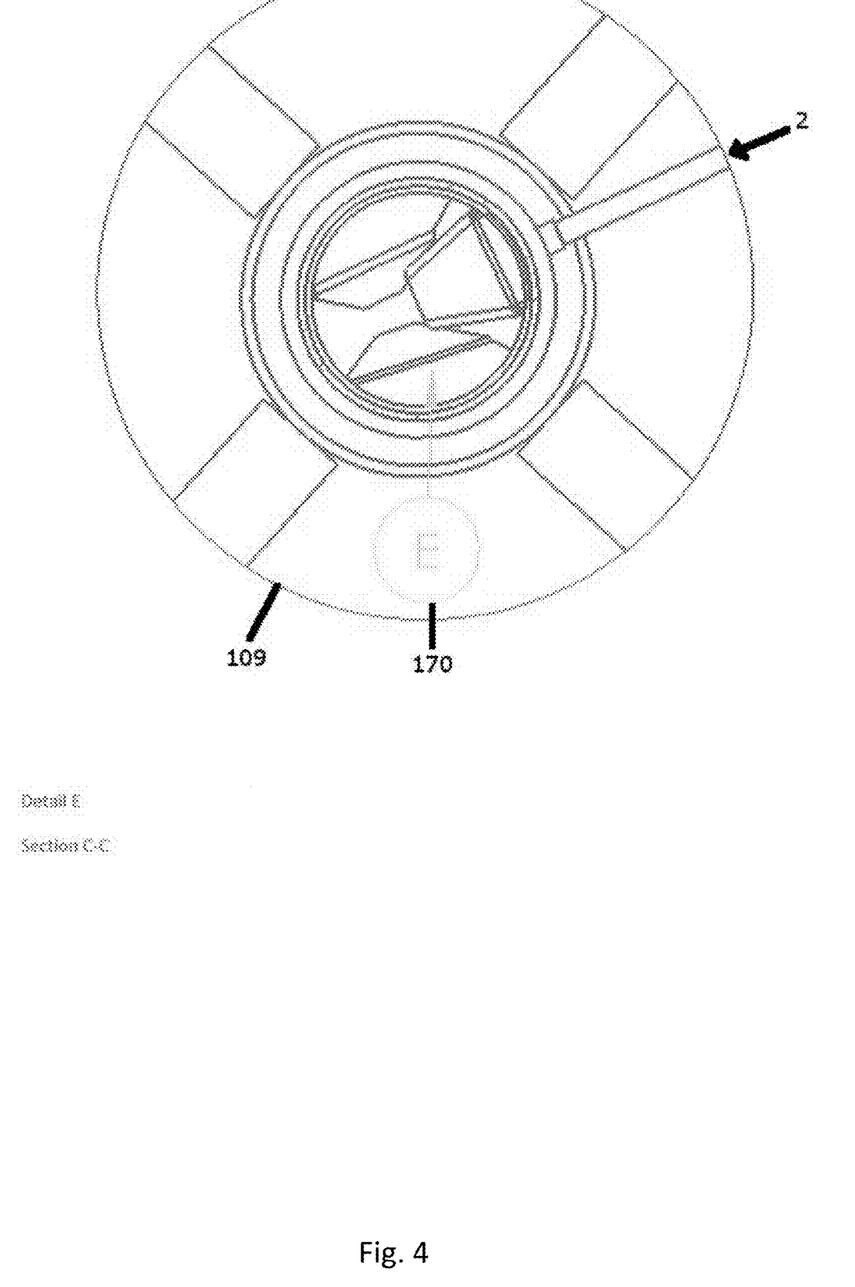
FIG. 4 is a cross section along plane C-C in FIG. 1.

FIG. 4 is a vertical cross section along C-C of a housing 109 containing a gas fluid mixer 170 as previously described.

The vertically mounted tube 1150 constitute part of the support structure for the horizontal plate 104 dividing the tank-segments 110 and 120, the conical bowl segment and the vortex plate 150 above the water outlet at the bottom of the tank-segment 120. Other designs; i.e. piping arrangements are anticipated and within the scope of the invention.

Figure 5:
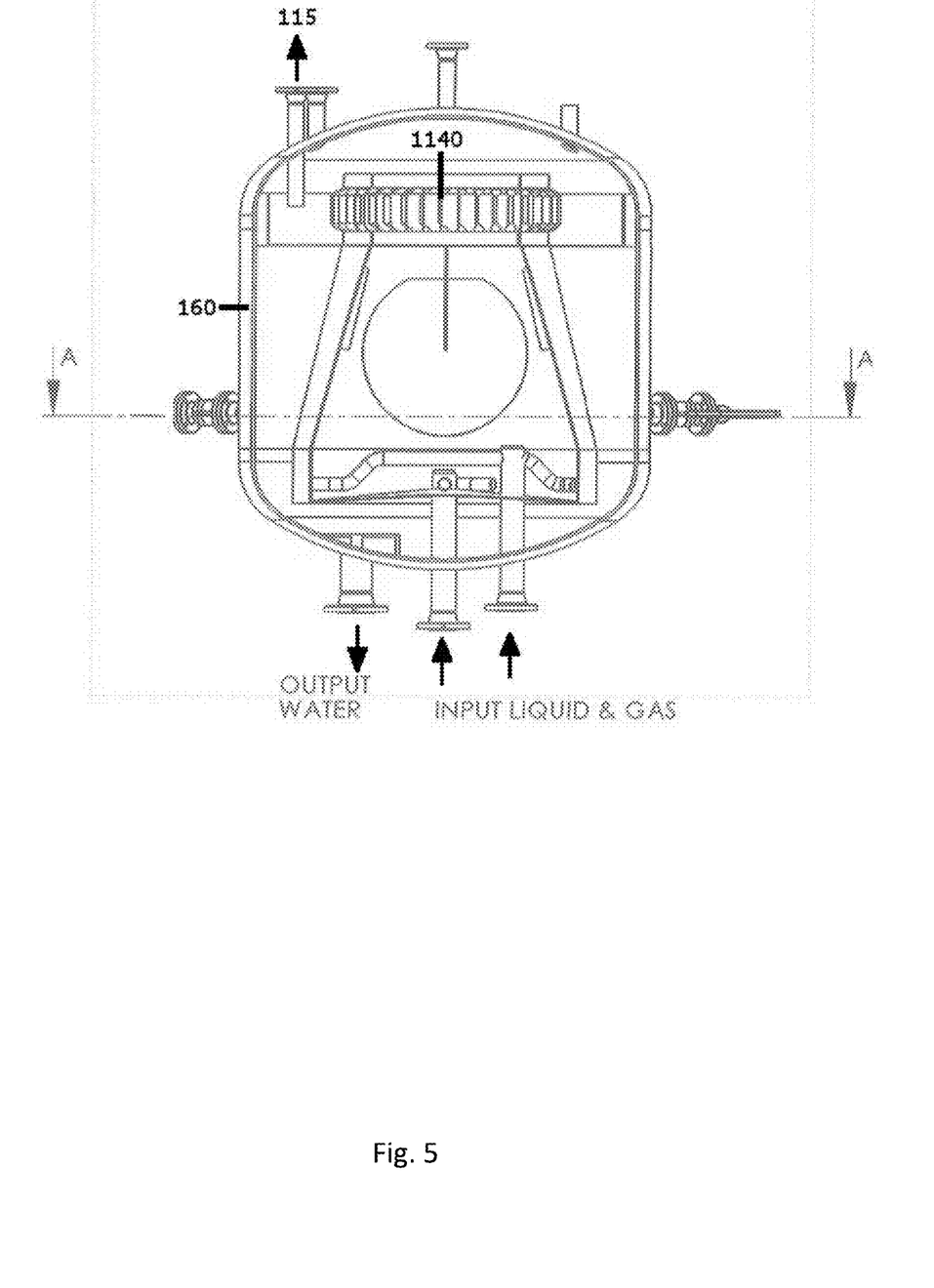
FIG. 5 illustrates a preferred embodiment of the invention with one conical bowl segment having double input ports.

FIG. 5 illustrates a single stage process having one conical wall segment with double input ports/pipes for mixtures of liquids and gas. The double input ports protruding through the outer tank shell and the lower part of the conical bowl and where pair of pipes from the input ports are spread individually into pipe end pieces tangentially adjacent to the inner wall of the conical wall segment. Each pair of these pipes are connected individually to a spread of two or more horizontal pipes with end pieces tangentially adjacent to the inner wall of the cone.

Figure 6:
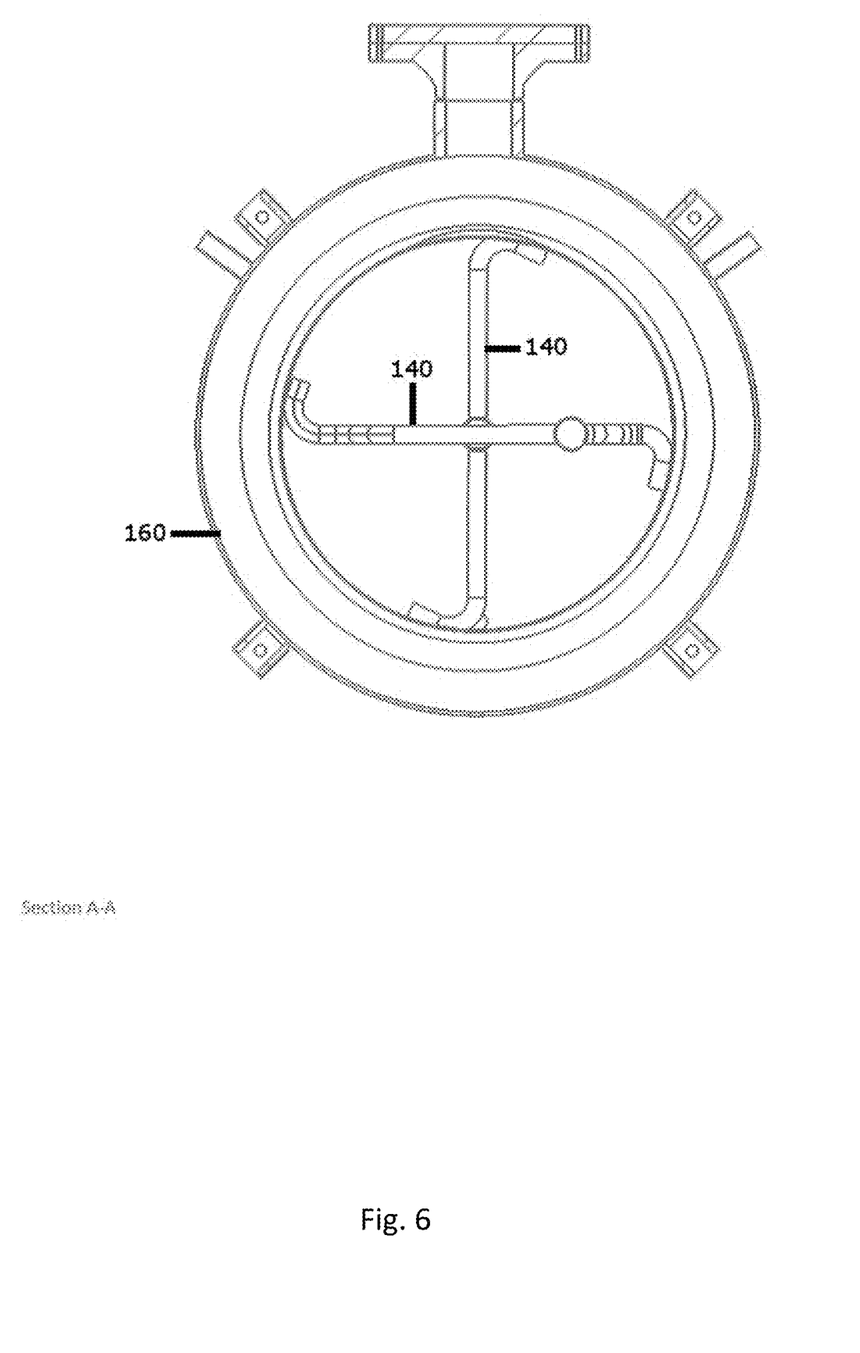
FIG. 6 is a cross section along the plane A-A in FIG. 5.

FIG. 6 is a cross section along plane A-A in FIG. 5 and illustrates the direction of flow from each pair or more of horizontal pipes, each pair individually connected to the two input ports/pipes. Each input port may be operated separately in order to obtain a wide capacity range by a single stage process.

FIG. 7 illustrates a preferred embodiment of the invention with two or more conical wall segments with inclined plated bottoms protruding radially downwards. Each set of segments have top mounted guide vanes (1140) shown on FIG. 5 and pipe spread (114) shown on FIG. 3 as described before. The downward flowing liquid from a previous conical segment enters the following conical segment through a centre mounted vertical pipe 190 and into the lower pipe spread, thereby reducing and simplifying the internal piping arrangement.

An axially movable plate represents a general flow regulator, controlling the input to the associated tank segment 110, 120. The flow regulator can be of any conventional design, e.g. a rotatable throttle body such a butterfly valve within an external pipe or a sliding plate for covering or uncovering a slit in the tank wall. Either way, the flow regulator adjusts the fluid flow into the apparatus, e.g. by fully closing a fraction of the inlets or by reducing or increasing the aperture through every inlet. In this manner, the apparatus 100 can be adapted to a range of input volume rates, and of course also to varying volume rates. Sensors, controllers, actuators and control algorithms, e.g. feedback to adapt the inlets to a measured flow or feed forward to adapt the inlets in advance to receive a known change, are generally known, and may be adapted to the apparatus of the invention in a conventional manner.

While the invention has been described with reference to specific examples and embodiments, the scope of the invention is determined by the accompanying claims.

The invention claimed is:

1. An apparatus for separating hydrocarbons from water, comprising a first tank segment with a fluid inlet subsequent a housing with a liquid-gas mixer, a fluid inlet through a cylindrical tank wall, and further through a wall of a conical wall segment, a pipe spread, combining radial and axial flow over ring mounted guide vanes at an upper part of the conical wall segment, a hydrocarbon outlet at a top end and a water outlet at a bottom end of the first tank segment, a pipe for scale and debris removal connected to a lower part of the conical wall segment wherein the conical wall segment extends to a top end of the first tank segment and at this location comprises a ring of vertically mounted guide vanes.

2. The apparatus according to claim 1, further comprising a second tank segment, wherein a fluid inlet of the second tank segment is connected to the water outlet of the first tank segment through a vortex plated exit connected to a pipe and a following pipe spread, being subject to additional gas through a gas inlet, a conical wall segment as in the first tank segment, wherein the second tank segment comprises a hydrocarbon outlet and a water outlet at a bottom of a tank cap.

3. The apparatus according to claim 2, wherein internal pressure in each subsequent tank segment is less than pressure in any previous tank segment.

4. The apparatus according to claim 2, wherein the pipe has a subsequent gas inlet for process gas.

5. The apparatus according to claim 1, further comprising a mixer for mixing process gas into the fluid upstream from the fluid inlet.

6. The apparatus according to claim 1, wherein the fluid inlet comprises a flow regulator mounted in the housing or in the external inlet pipe.

7. The apparatus according to claim 2, wherein the hydrocarbon outlets from the first and second tank segments lead into a common pipe line.

8. An apparatus according to claim 1, comprising an outer tank shell with an inner conical wall segment, and with double inlet ports/pipes and liquid gas mixers at a bottom of the outer tank shell, where the pipes protrudes into the lower part of the conical wall segment and are each spread into a total two to four or more horizontal pipe-segments each extending into end pieces tangentially adjacent to an inner wall of the conical wall segment.

9. An apparatus according to claim 1, comprising a tank segment with fluid inlet subsequent a liquid gas mixer, the fluid inlet through a cylindrical tank wall and through the symmetrical downward sloping bottom plate of the conical wall segment and into the pipe spread and close to the bottom of the conical wall segment resulting in flow conditions with downward water flowing outlet at the centre mounted vortex breaker in line with a vertical pipe protruding through the plate dividing the tank segment in similar parts and being connected to the conical wall segment pipe spread in the lower half of the tank shell resulting in identical flow conditions as for the upper tank half and with clean water outlet flow at the bottom of the lower tank segment, where sediments and debris are extracted from the lowest parts of the sloping bottoms of the conical wall segments.

10. The apparatus according to claim 3, wherein the pipe has a subsequent gas inlet for process gas.

11. An apparatus according to claim 2, comprising an outer tank shell with an inner conical wall segment, and with double inlet ports/pipes and liquid gas mixers at a bottom of the outer tank shell, where the pipes protrudes into the lower part of the conical wall segment and are each spread into a total two to four or more horizontal pipe-segments each extending into end pieces tangentially adjacent to an inner wall of the conical wall segment.

12. An apparatus according to claim 2, comprising a tank segment with fluid inlet subsequent a liquid gas mixer, the fluid inlet through a cylindrical tank wall and through the symmetrical downward sloping bottom plate of the conical wall segment and into the pipe spread and close to the bottom of the conical wall segment resulting in flow conditions with downward water flowing outlet at the centre mounted vortex breaker in line with a vertical pipe protruding through the plate dividing the tank segment in similar parts and being connected to the conical wall segment pipe spread in the lower half of the tank shell resulting in identical flow conditions as for the upper tank half and with clean water outlet flow at the bottom of the lower tank segment, where sediments and debris are extracted from the lowest parts of the sloping bottoms of the conical wall segments.

13. The apparatus according to claim 2, further comprising a mixer for mixing process gas into the fluid upstream from the fluid inlet.

14. The apparatus according to claim 2, wherein the fluid inlet comprises a flow regulator mounted in the housing or in the external inlet pipe.

15. The apparatus according to claim 3, wherein the hydrocarbon outlets from the first and second tank segments lead into a common pipe line.

* * * * *